US011112179B2

(12) United States Patent
Manasek

(10) Patent No.: US 11,112,179 B2
(45) Date of Patent: Sep. 7, 2021

(54) STEELMAKING AND IRONMAKING SCRAP SEGREGATION AND PACKAGING SYSTEM AND METHOD THEREOF

(71) Applicant: AMERIFAB, INC., Indianapolis, IN (US)

(72) Inventor: Richard Manasek, Carmel, IN (US)

(73) Assignee: AMERIFAB, INC., Indianapolis, IN (US)

(*) Notice: Subject to any disclaimer, the term of this patent is extended or adjusted under 35 U.S.C. 154(b) by 314 days.

(21) Appl. No.: 16/108,580

(22) Filed: Aug. 22, 2018

(65) Prior Publication Data

US 2019/0063838 A1 Feb. 28, 2019

Related U.S. Application Data

(60) Provisional application No. 62/549,089, filed on Aug. 23, 2017.

(51) Int. Cl.
F27B 3/18 (2006.01)
F27B 3/08 (2006.01)
C21C 5/52 (2006.01)
F27B 3/24 (2006.01)
F27B 3/06 (2006.01)
(Continued)

(52) U.S. Cl.
CPC ............... F27B 3/18 (2013.01); C21C 5/527 (2013.01); C21C 5/5294 (2013.01); F27B 3/085 (2013.01); F27B 3/24 (2013.01); C21C 2005/5258 (2013.01); C21C 2200/00 (2013.01);
(Continued)

(58) Field of Classification Search
CPC .... F27B 3/18; F27B 3/085; F27B 3/24; F27B 3/065; C21C 5/527; C21C 5/5294; C21C 2005/5258; C21C 2200/00; C22B 1/005; C22B 7/003; F27D 17/003
See application file for complete search history.

(56) References Cited

U.S. PATENT DOCUMENTS 4,302,331 A * 11/1981 Condit, Jr. ........... B01D 33/327
198/713
6,261,043 B1 * 7/2001 Weems ..................... B66C 1/06
294/68.22
(Continued)

FOREIGN PATENT DOCUMENTS

GB 842518 A * 7/1960 ................ F27B 3/18
JP 2015021321 A 2/2015

OTHER PUBLICATIONS

International Search Report and Written Opinion, Korean Intellectual Property Office, PCT/US2018/047475, dated Nov. 19, 2018.

Primary Examiner — Anthony J Zimmer
Assistant Examiner — Ricardo D Morales
(74) Attorney, Agent, or Firm — Taft Stettinius & Hollister LLP; Stephen F. Rost

(57) ABSTRACT

A method of charging a pre-packaged charge in a metallurgical or refining furnace includes providing a disposable metal container having at least one attachment member and forming a pre-packaged charge by loading scrap material into the metal container. The method also includes releasably coupling the at least one attachment member of the container to a lifting device, and then de-coupling the pre-packaged charge from the lifting device so that the combination of the scrap material and the disposable metal container are charged in the furnace.

18 Claims, 7 Drawing Sheets

(51) Int. Cl.
*C22B 1/00* (2006.01)
*C22B 7/00* (2006.01)
*F27D 17/00* (2006.01)

(52) U.S. Cl.
CPC .............. *C22B 1/005* (2013.01); *C22B 7/003* (2013.01); *F27B 3/065* (2013.01); *F27D 17/003* (2013.01)

(56) References Cited

U.S. PATENT DOCUMENTS

| | | | |
|---|---|---|---|
| 7,674,315 B2 * | 3/2010 | Reiffel | F27B 1/20 75/484 |
| 2001/0043639 A1 | 11/2001 | Shver | |
| 2014/0144816 A1 | 5/2014 | Baker | |

* cited by examiner

STEELMAKING AND IRONMAKING SCRAP SEGREGATION AND PACKAGING SYSTEM AND METHOD THEREOF

RELATED APPLICATIONS

The present application claims the benefit of U.S. Provisional Patent Application Ser. No. 62/549,089, filed Aug. 23, 2017, the disclosure of which is hereby incorporated by reference in its entirety.

FIELD OF THE DISCLOSURE

The present disclosure relates to the use of scrap, and, in particular, to a scrap segregation and packaging system during an ironmaking or steelmaking process.

BACKGROUND

The metals industry requires that scrap material be collected, segregated, transported and charged into furnaces for re-melting into high quality metal in a quantity and with physical characteristics required for the envisioned final product. Scrap is utilized in electric arc furnace steelmaking (EAF), basic oxygen furnace (BOF) steelmaking, foundries (e.g. cupola furnaces, induction furnaces, EAF, etc.), smelting operations (non-ferrous metals and materials) and any other process that requires a scrap based feed stock material. Conventional methods of collecting and delivering scrap to operating furnaces results in approximately 25-40% of the charge being either inert material (e.g. dirt, sand, etc.) and undesirable metals. For example, introduction of undesirable materials (metals) such as lead and copper in iron and steelmaking furnaces can result in the production of an off-specification final product. There is currently no easy way to refine those metals out of the specific final product in the molten state.

SUMMARY

In one embodiment of the present disclosure, a method of charging a pre-packaged charge in a metallurgical or refining furnace includes providing a disposable metal container having at least one attachment member; forming a pre-packaged charge by loading scrap material into the metal container; releasably coupling the at least one attachment member of the container to a lifting device; de-coupling the pre-packaged charge from the lifting device; and charging the scrap material and the disposable metal container in the furnace.

In one example of this embodiment, the method can include removing dirt, debris and other contaminants from the pre-packaged charge during the forming step. In a second example, the dirt, debris and other contaminants are removed from the pre-packaged charge by falling through one or more openings defined in the disposable metal container. In a third example, the method can include selecting the disposable metal container based on the type of scrap material for forming the pre-packaged charge.

In a fourth example, the forming step is performed at a location remote from the furnace. In a fifth example, the forming step is performed at a scrap yard. In a sixth example, the de-coupling step comprises releasing the at least one attachment member from the lifting device.

In a seventh example, the method can include opening a roof of the furnace before the de-coupling step; positioning the pre-packaged charge at a location above the furnace once the roof is opened; and lowering the pre-packaged charge into the furnace. In an eighth example, the method can include closing the roof immediately after the de-coupling step. In a ninth example, the method can include melting the disposable metal container with the scrap material.

In a further example of this embodiment, the method can include loading the pre-packaged charge in a transport vehicle at a location remote from the furnace; transporting the pre-packaged charge to the furnace; transferring the pre-packaged charge from the transport vehicle; and performing the charging step after the transferring step.

In another embodiment of the present disclosure, a pre-packaged charge for being discharged into a metallurgical or refining furnace includes a disposable container comprising a body formed by a plurality of interconnecting wire, the body defining a plurality of gaps between the plurality of wire; a plurality of attachment members formed with or coupled to the body; and segregated scrap disposed in the container, the segregated scrap being of a particular material type; wherein, the disposable container is made of a type of material that is substantially the same as the scrap; wherein, the pre-packaged charge is free of dirt, debris and other contaminants which freely drop through the plurality of gaps defined in the container.

In one example of this embodiment, the disposable container may include a metallic concave-shaped basket formed by a plurality of interconnecting wire that radially diverge from a bottom end thereof. In a second example, the disposable container may include a substantially flat wire body formed by the plurality of interconnecting wire which define the plurality of gaps therebetween, where the plurality of attachment members are located at least at each corner of the body. In yet another example, the disposable container may include a box-shaped wire body formed by the plurality of interconnecting wire, the container including a bottom, an open top, and sides in which the bottom and sides include the plurality of gaps, and the plurality of attachment members being coupled to the sides of the wire body.

In a further embodiment of the present disclosure, a method of charging a pre-packaged assembly in a metallurgical or refining furnace includes separating scrap based on at least one characteristic; loading the scrap into a disposable metal container having a plurality of attachment members; forming the pre-packaged assembly as a combination of the scrap and the disposable metal container; coupling the plurality of attachment members of the container to a lifting device; lifting the pre-packaged assembly into the furnace; releasing the plurality of attachment members from the lifting device; and charging the pre-packaged assembly in the furnace for a melting operation.

In one example of this embodiment, the method may include loading the pre-packaged assembly in a transport vehicle at a location remote from the furnace; transporting the pre-packaged assembly to the furnace; transferring the pre-packaged assembly from the transport vehicle; and performing the charging step after the transferring step. In another example, the method may include removing dirt, debris and other contaminants from the scrap during at least the loading and forming steps. In yet another example, the dirt, debris and other contaminants are removed from the pre-packaged assembly by falling through one or more openings defined in the disposable metal container. In a further example, the method may include selecting the disposable metal container based on the at least one characteristic.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described herein are not intended to be exhaustive or to limit the disclosure to the precise forms disclosed in the following detailed description. Rather, the embodiments are chosen and described so that others skilled in the art appreciate and understand the principles and practices of the present disclosure.

Figure 1:
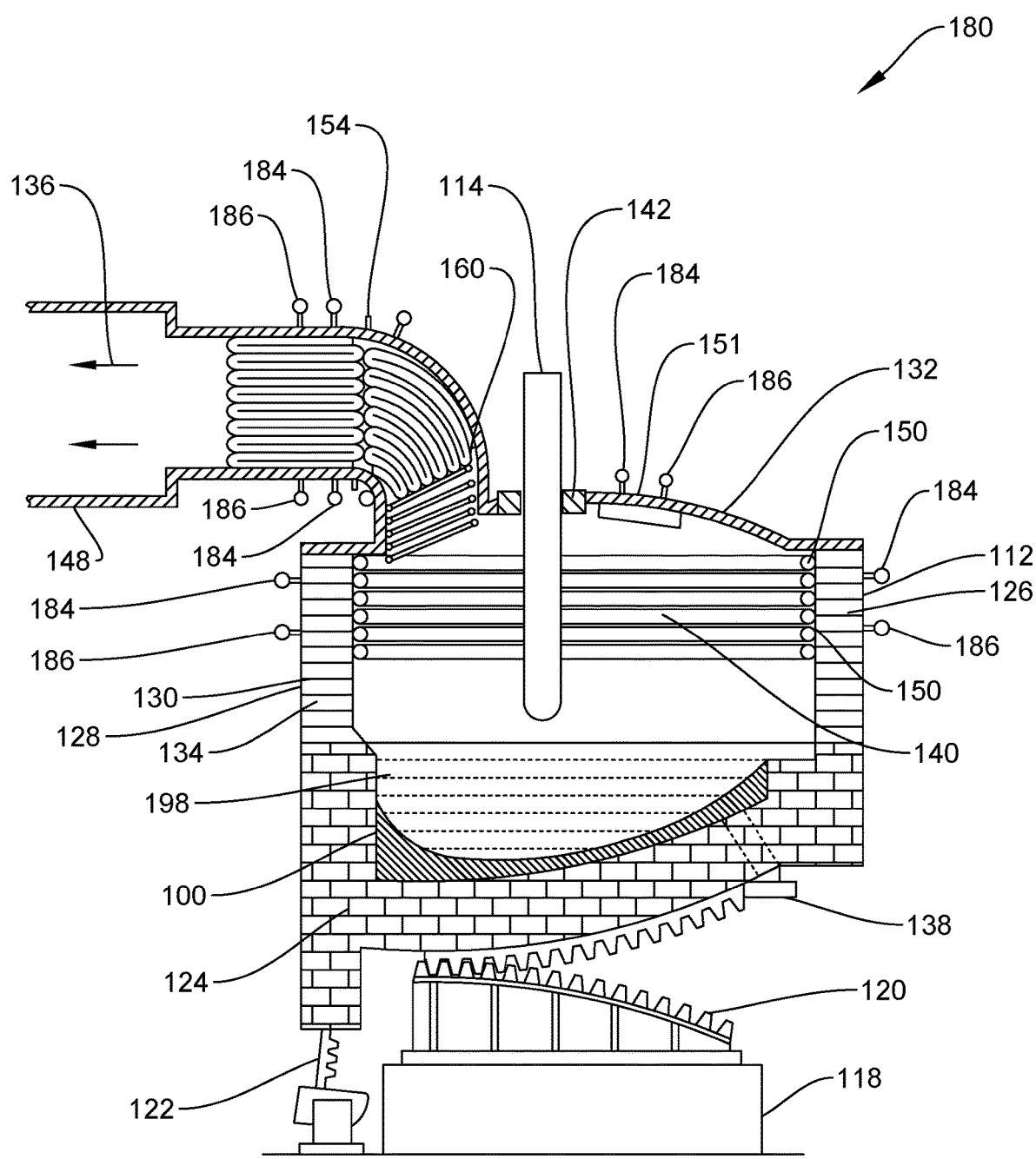
FIG. 1 is a cross-sectional schematic of a steel-making furnace.

Referring to FIG. 1, one embodiment of a furnace is illustrated as an electric arc furnace ("EAF") 180. While the EAF is disclosed as one example, it is understood the principles and teachings of the present disclosure may be readily applied in an ironmaking furnace, a basic oxygen furnace (BOF) and the like. In FIG. 1, an EAF 180 may include a furnace shell 112, a plurality of electrodes 114, an exhaust system 116, a working platform 118, a rocker tilting mechanism 120, a tilt cylinder 122, and an off gas chamber. The furnace shell 112 may be movably disposed upon the rocker tilt 120 or other tilting mechanism. Further, the rocker tilt 120 may be powered by the tilt cylinder 122. The rocker tilt 120 may also be further secured upon the working platform 118.

The furnace shell 112 may include a dished hearth 124, a generally cylindrical side wall 126, a spout 128, a spout door 130, and a general cylindrical circular roof 132. The spout 128 and spout door 130 are located on one side of the cylindrical side wall 126. In the open position, the spout 128 may allow intruding air 134 to enter the hearth 124 and partially burn gasses 136 produced from smelting. The hearth 124 is formed of a suitable refractory material. At one end of the hearth 124 is a pouring box having a tap means 138 at its lower end. During a melting operation, the tap means 138 is closed by a refractory plug, or a slidable gate. Thereafter, the furnace shell 112 is tilted, the tap means 138 is unplugged, or open and molten metal is poured into a teeming ladle, tundish, or other device, as desired.

The inside wall 126 of the furnace shell 112 may be fitted with water cooled panels 140 of sinuously winding piping 150. The panels, in effect serve as an interior wall in the furnace 180. The manifolds, which supply cool water and a return, are in fluid communication with the panels 140. Typically, the manifolds are positioned peripherally in a fashion similar to the illustrated exhaust ducts 144.

The heat exchanger system 110 produces a more efficient operation and prolongs the operation life of the EAF furnace 110. In one illustrative embodiment, the panels 140 may be assembled such that the sinuously winding piping has a generally horizontal orientation. The piping 150 can be linked with a linkage or have a base that is mounted to the wall. Alternatively, the panels 140 can be mounted such that the sinuously winding piping 150 has a generally vertical orientation. The upper ends of the panels 140 may define a circular rim at the upper margin of the side wall 126 portion of the furnace 180.

The heat exchanger system 110 can be fitted to the roof 132 of the furnace 180, wherein the water cooled panels 140 have a curvature that substantially follows the domed contour of the roof 132. The heat exchanger system 110 may be deployed on the inside of side wall 126 of the furnace 180, the roof 132 and the entrance of the exhaust system 116, as well as throughout the exhaust system 116. As such, the heat exchanger system 110 can protect the furnace and cools the hot waste gasses 136 as they are ducted to a bag house or other filtering and air treatment facilities, where dust is collected and the gasses are vented to the atmosphere.

In operation, hot waste gasses 136, dust and fumes are removed from the hearth 124 through a vent 146 in the furnace shell 112. The vent 146 may be in communication with an exhaust system.

The panel 140 can have a plurality of axially arranged pipes 150. U-shaped elbows can connect adjacent sectional lengths of piping or pipes 150 together to form a continuous piping system. Linkages and the like that additionally serve as spacers may be between adjacent pipes 150, and they provide structural integrity of the panel 140 and are determinative of curvature to the panel 140.

The heat exchange system or heat exchanger 110 may include at least one panel of the sinuously winding piping 150 having an inlet (not shown) and an outlet (not shown), an input manifold in fluid communication with the inlet of the at least one panel, an-output manifold in fluid communication with the outlet of the at least one panel, and a cooling fluid flowing through the piping 150. The heat exchanger system 110 cools hot fume gasses 136 and dust that is being evacuated from the metallurgical furnace 180 and its supporting components. The piping is an assemblage of sectional lengths of connected tubes mounted side-by-side, wherein the connected tubes are secured to each other with the linkage, therein forming the at least one panel 150.

It has been determined that one illustrative and desirable composition for fabricating the piping 150 is of an aluminum bronze alloy. Aluminum bronze alloys have been found to have a higher than expected thermal conductivity, resistance to etching by the stream of hot gasses (modulus of elasticity), and good resistance to oxidation. Thus, the operational life of the heat exchanger is extended. Corrosion and erosion of the heat exchanger and related components is reduced, when they are fabricated with aluminum bronze. Aluminum bronze has thermal conductivity that is 41% higher than P22 (about 96% Fe, 0.1% C, 0.45% Mn, 2.65% Cr, 0.93% Mo) and 30.4% than carbon steel (A106B). The heat exchangers fabricated using aluminum bronze and alloys thereof are more efficient, and have a longer operational life than furnace constructed of refractive materials and or other metal alloys.

It has also been determined that the piping 150 may be extruded, and that extruding may help the piping resist corrosion, erosion, pressure, and thermal stress. The piping can be curved or bent to match the curvature of a wall to which it is being attached, if so needed. More typically, the individual sections of piping are secured to each other with an angled linkage such that the resulting panel has a curvature that is comparable to the curvature of the wall.

Figure 2:
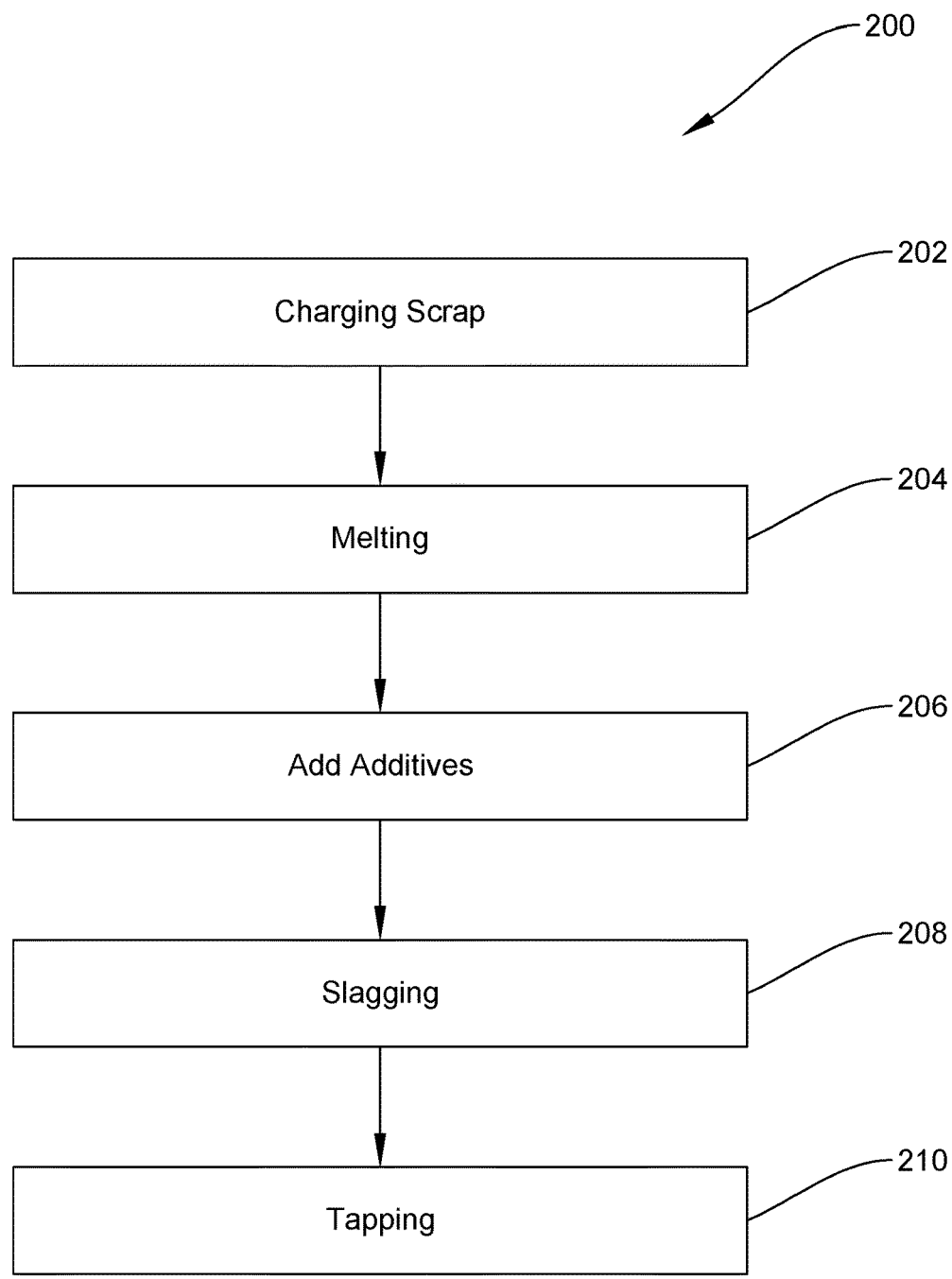
FIG. 2 illustrates a flow diagram of a melting process in a metallurgical furnace.

Referring to FIG. 2, an overview of a melting process in a furnace such as the one shown in FIG. 1 is presented. The melting process 200 may include a plurality of blocks or steps for performing the operation. Here, a first block 202 is shown in which scrap may be charged. To do so, the roof of the furnace may be pulled or moved away such that a charging bucket may dump scrap into the furnace. In a second block 204, the roof may be closed and electrodes may be brought into the furnace to heat the scrap and melt it into molten steel. In a third block 206, additives may be added to the furnace to assist with the melting process 200. For example, a side door of the furnace may be opened so that oxygen or carbon may be blown or otherwise added into the furnace to assist with the melting.

After block 206, the melting process 200 may advance to block 208 where a slagging step is executed. Here, the furnace may be tipped in one direction to remove waste material from the top of the molten liquid and collect the slag in a slag pot. Here, a decarburizing process may also be implemented to remove carbon or reduce the carbon content from the furnace. In a fifth block 210, a tapping step may be executed where the furnace is tilted in a direction opposite from the slagging step. Here, the molten liquid may be poured into a ladle where it is later processed.

The aforementioned method is but one example of a melting process. Before the melting process, however, it is necessary to collect the scrap material that forms the charge. The charge, or often referred to as a pre-measured charge, is the load of scrap and other materials that is loaded in a scrap bucket and dumped into the furnace to initiate the melting process.

Conventional methods for collecting scrap include scrap companies collecting or receiving material from various sources and segregating the scrap into piles in a dirt scrap yard according to various classifications. Examples of these classifications may include (a) #1 or #2 Heavy Melting (HMS), (b) #1 or #2 Bundles, (c) Bushlings, (d) Cast Iron, (e) Railroad Rail, (f) Shredded, (g) Pig Iron, and (h) Turnings. Other classifications such as simply ferrous and nonferrous may exist as well.

As a result of conventional scrap processing by cranes outfitted with magnets/clamps, vibration systems, and other mobile work machines, such as front-end loaders, the collection of dirt, sand, ice, water or debris along with any undesirable metals contaminating the scrap pile is unavoidable and is thus integrated into the scrap that is charged into the furnaces. In some instances, approximately 25-40% of what goes into a melt is debris and other residuals, and if not separated, these materials combine with the desired material to form the after-product. Moreover, if ice is dispersed into the furnace, an explosion or other violent reaction is possible due to the hydrogen atoms in water. It is therefore desirable to provide a method for collection, segregation and screening out dirt, debris and undesirable metals from the scrap material so that the scrap being sold and ultimately charged into a melting furnace is nearly 100% the desired metal with little to no cross-contamination of undesirable materials.

Figure 3:
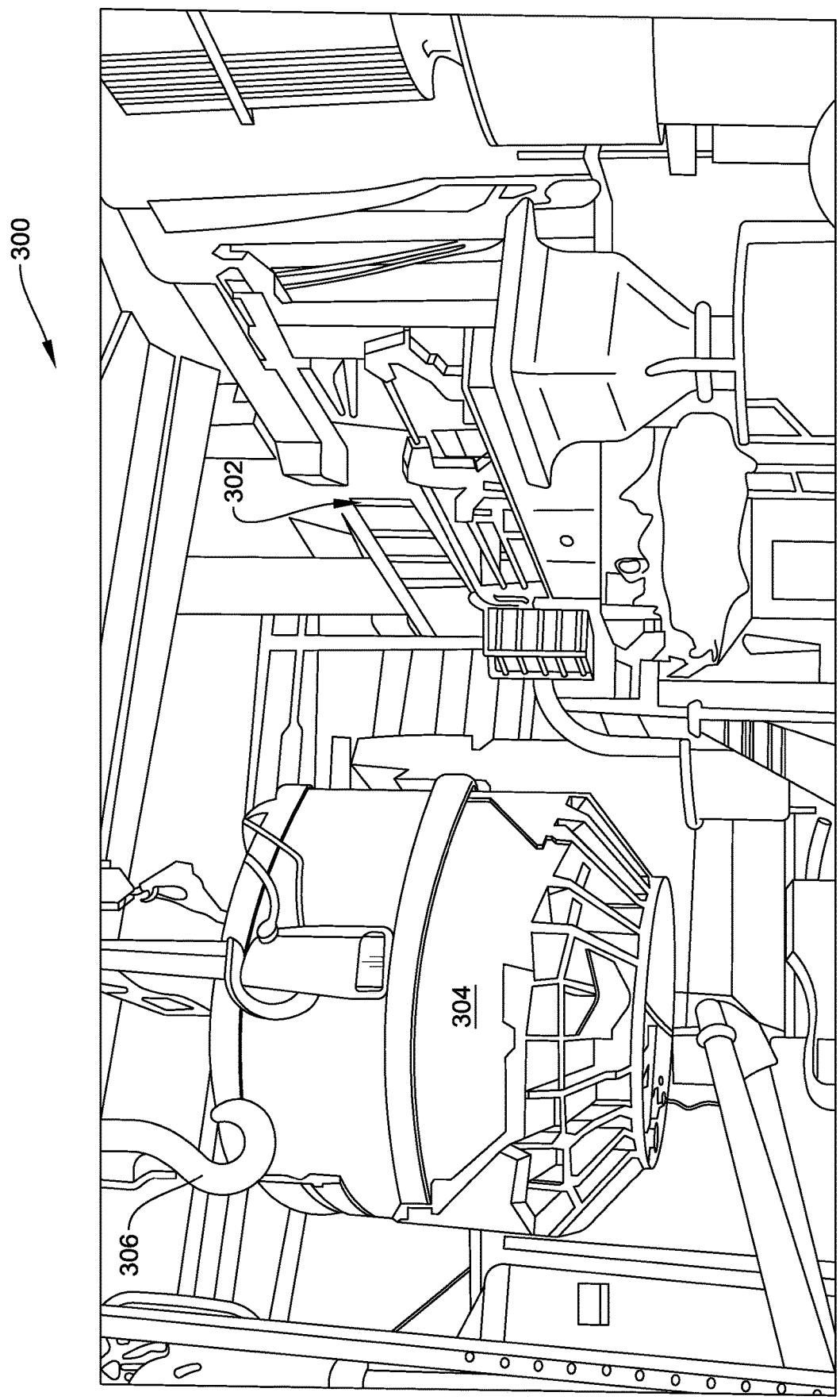
FIG. 3 is a schematic view of a roof of a furnace in its open position for receiving a scrap bucket and a discharge of scrap into the furnace.

A conventional method for charging scrap into a furnace is to collect scrap from a regional scrap center, deliver the scrap to a manufacturing facility scrap yard, and transfer it to a scrap bucket for charging into a furnace. As shown in FIG. 3, a roof of a furnace 302 of a conventional steelmaking system 300 may be opened to allow a scrap bucket 304 to discharge the scrap into the furnace 302. The scrap bucket 304 may first be loaded with the charge material and then a crane with a hoist 306 may lift the scrap bucket 304 above the open furnace 302. The bucket 304 may then be tilted to discharge the scrap into the furnace 302, and if too much material is loaded in the furnace, a crane operator may maneuver the bucket over the scrap and drop the bucket to compress the scrap. This may be necessary particularly if the scrap is piled too high in the furnace 302 for the roof to be closed. It is noteworthy that while the roof is open, heat and other energy is lost from the furnace 302. This makes the melting process inefficient and less productive.

In addition, scrap buckets 304 such as the one in FIG. 3 can require a lot of maintenance to keep in service. When a bucket is damaged or unusable, it can be an inconvenience and add to the lack of productivity at a steel mill, for example.

Thus, conventional methods of separating and handling scrap is inefficient in terms of delivering clean scrap to the furnace. The magnet and front-end loader scrap transfer operations indiscriminately pick up scrap along with other undesirable metals, dirt and debris materials that are inadvertently mixed with it. It is therefore difficult, and sometimes nearly impossible, to provide a clean source of scrap using conventional handling methods. As noted above, approximately 25-40% of the scrap charge may include undesirable materials. This inconvenience is in addition to the loss of heat or energy from the furnace during a conventional charging step 202 and required maintenance of the conventional scrap buckets.

To overcome these issues, the present disclosure provides one or more embodiments in which scrap may be placed into a container at the source of collection and segregation so that the proper scrap classifications can be maintained throughout the scrap transportation and delivery process. In addition, the modularization of the scrap delivery system may simplify the furnace charging methods. It may also assure melting furnace operators that their scrap charge is nearly 100% the quality and specification of the scrap they purchased.

Figure 5:
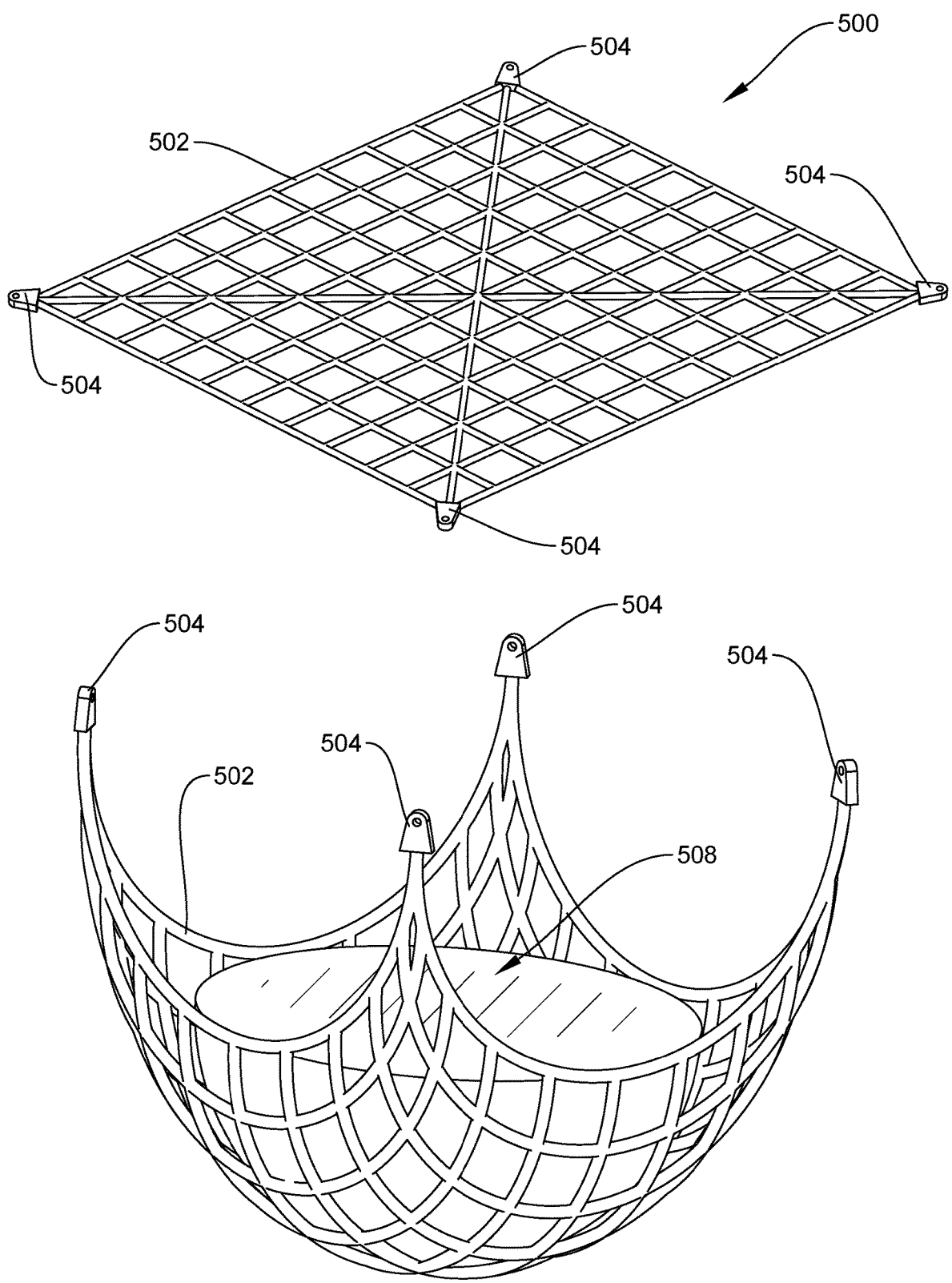
FIG. 5 is a perspective view of a scrap segregation container design with flat wire rope design.
Figure 6:
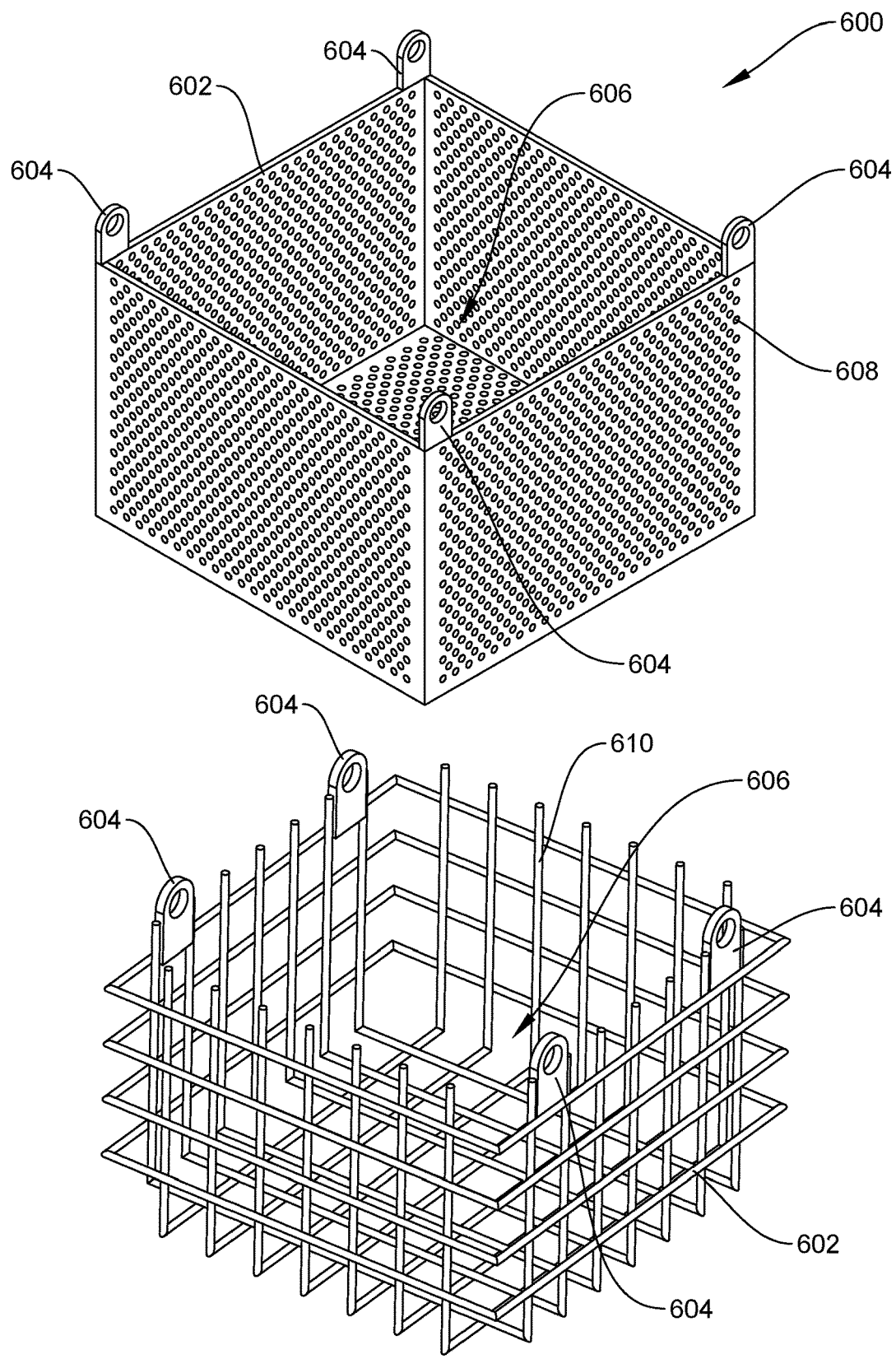
FIG. 6 a perspective view of a scrap segregation container design plate and rebar structure design.

In one example of this disclosure, a method may include segregating scrap into bins and/or wire rope sacks that can be easily filled, handled, transported and charged into furnaces. Wire rope bins or sacks may be designed to have spacing between the wire ropes that maintain the scrap inside the sack but allow any smaller dirt or debris to drop out during charging into the sack. The sacks may be formed into a basket or simply remain flat with 4 lifting points, or may be flat so that scrap is charged on the flat surface then folded up and tied up into a secured closed sack. Examples of this are shown in FIGS. 4-6 of this disclosure.

Figure 4:
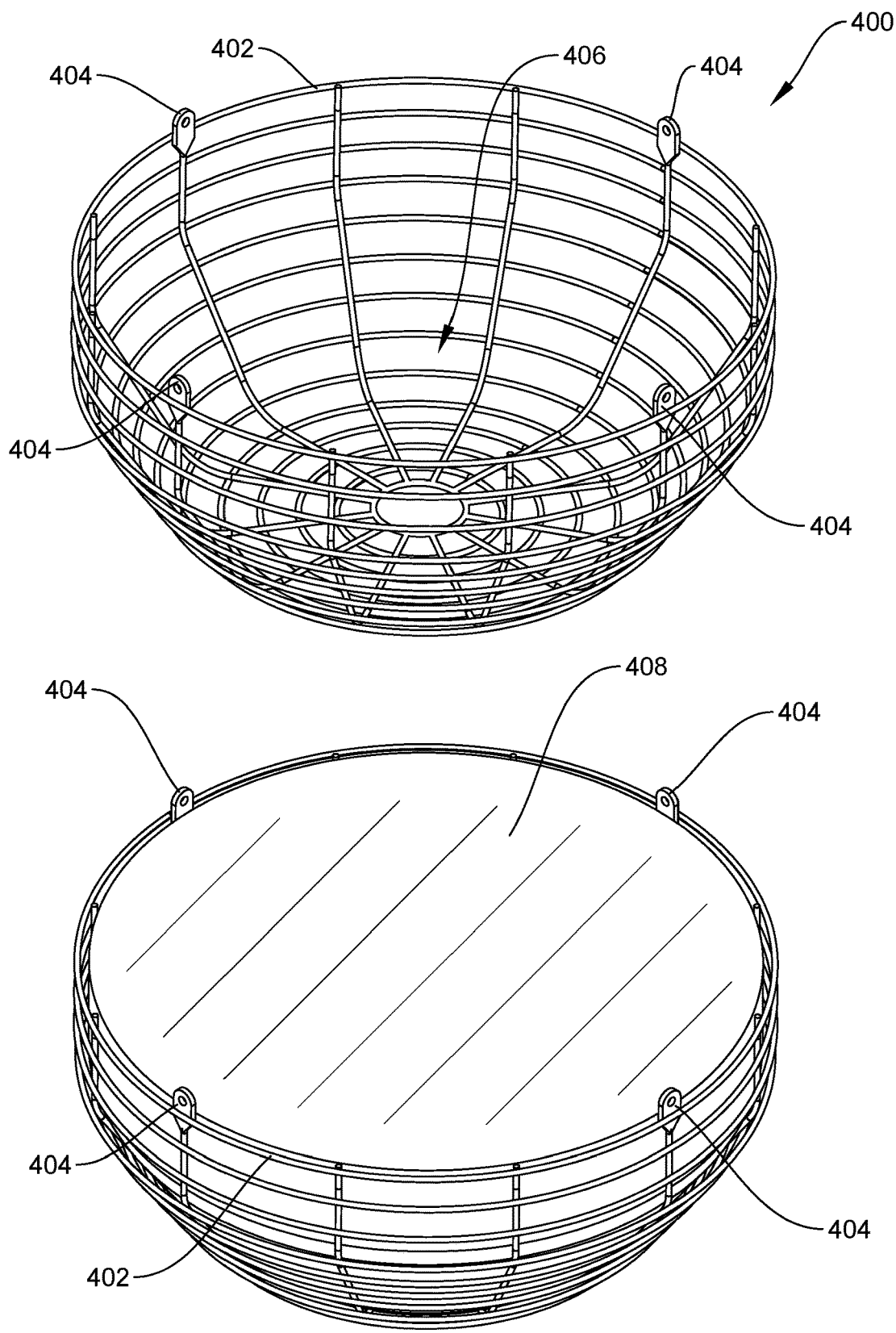
FIG. 4 is a perspective view of a scrap segregation container design basket wire rope or rebar design.

Referring to FIG. 4, one embodiment of a scrap segregation container design 400 of a wire rope sack 402. The sack 402 may be formed by a plurality of wire that protrudes radially outward from a bottom thereof to form at least partially vertical barriers. In addition, wire may endlessly extend circumferentially at different radii from the bottom to form horizontal barriers. Gaps or openings between the wire can allow dirt, dust, debris, ice, and other unwanted materials to not form part of the charge.

The wire sack 402 may include one or more attachment members 404 to which a hoist (not shown) can lift the sack into the furnace. The attachment members 404 may be designed for being releasably coupled to the hoist, and thus a crane operator, for example, may be able to release the sack 402 from the hoist as desired.

The wire sack 402 may further be folded as shown in FIG. 4 to allow a charge of material 408 to be loaded in the sack 402 via an upper end 406. With the wire sack 402 preloaded with the charge material 408, a pre-packaged charge 400 is provided which can be loaded in a gondola or rail car and shipped from a scrap yard to a steel mill, for example. Advantageously, the material of the wire sack 402 is such that it too forms part of the charge. Thus, when a crane lifts the wire sack 402 and its charge material 408 above the furnace opening, the crane operator can actuator the hoist to release the entirety of the wire sack 402 and charge material 408 into the furnace. The wire sack 402 is consumable and thus no scrap bucket is required. Moreover, as soon as the pre-packaged charge 400 is discharged into the furnace, the furnace roof may immediately be closed to thereby reduce the amount of heat and energy lost from the furnace compared to most conventional charging processes.

In FIG. 5, another embodiment of a pre-packaged charge 500 is illustrated. In FIG. 4, the wire sack 402 comprises a concave structure with or without the charge material 408. On the other hand, in FIG. 5, a wire rope sack or container 502 is designed to be flat as shown. It may include a plurality of spaces or gaps between wires to maintain charge material 508 within the sack 502, but at the same time allow any smaller dirt, debris, ice, etc. to fall out when loading the charge material 508 in the sack 502.

The sack 502 may include multiple attachment members 504 for being releasably coupled to a hoist of a crane. As shown in FIG. 5, there are four attachment members 504 formed on the sack 502, but this is only intended to be one such example. There may be any number of attachment members as part of the sack 502. As charge material 508 is loaded onto the flat wire sack 502, the attachment members 504 may be lifted up and eventually either tied together or coupled to one another to hold the charge material 408 within. As the attachment members 508 are lifted up, the charge material 508 may continue to be loaded into the sack 502 via an open end 506.

Turning to FIG. 6, different embodiments of a pre-packaged charge 600 are shown. Here, the pre-packaged charge 600 is part of a bin-shaped design 602. In each case, the bin 602 is box-shaped with an open end 606 to load charge material. The wire 610 or other material used to form the bins 602 may be arranged to define openings or slots 608 therein to allow smaller debris, dirt, ice, etc. to drop out. These openings or slots 608 may be defined in each side and bottom of the bins 602. The bins 602 may further include a rebar construction with plate corner structure to strengthen the bins.

Similar to FIGS. 4 and 5, the bins 602 may include a plurality of attachment members 604 for releasably coupling to a hoist or other lift device. Moreover, when loaded with charge material, the bins 602 are consumable products in that they too form part of the charge. Thus, when discharging the charge material into the furnace, the entire pre-packaged charge 600 (including the bin 602) may be discharged into the furnace for melting. This allows for a more controllable and efficient charging and melting process, and decreases the inefficiency and loss of energy from the furnace when using a conventional scrap bucket. As noted above, the conventional scrap bucket is often over-loaded with scrap material, and thus the bucket is used to compress the charge material into the furnace. Moreover, when the bucket dumps the material into the furnace, the charge material free falls into the furnace and can induce a violent reaction. In the present disclosure, a crane can lift the disposable pre-packaged charge above the furnace and slowly drop it into the furnace to minimize the reaction of the charge being discharged into the furnace. Thus, it is a more controlled charging process.

In each of the embodiments of FIGS. 4-6, the examples of different pre-packaged charges are shown in which a wire sack, container, bin, etc. is shown forming part of the charge material. As such, the material of the sack, container, bin, etc. may be a mild steel and its size may vary depending upon the furnace into which the sack, container, bin, etc. is being discharged. Further, the size of each sack, for example, can depend upon how much charge is needed for a certain melting cycle. Moreover, the size of each sack, for example, can also be customized or optimized for fitting a greater density of pre-packaged charge into a gondola or rail car when shipping to a steel mill, for example. In some instances, the wire sack, container or bin may be as large as an office or room. In one non-limiting example, a wire bin may be greater than 12'×12' with sides at least 4' tall.

In one example, a bin made with rebar construction along with a plate corner structure may include spacing between the rebars to allow debris to sift out but scrap to remain inside the bin. Another example of a bin may be formed of 100% Rebar construction with spacing between the rebars to allow debris to sift out but scrap to remain inside the bin.

The materials of manufacture for the bins and sacks may be consistent with the chemical and physical characteristics of the scrap material. The size and design of the bins and sacks may be varied to accommodate manufacturer requirements for furnace operation. The bins or sacks may also be sized for optimal use for direct charging into scrap buckets or directly into a furnace. For example, a 6 feet×6 feet×6 feet bin or sack may include approximately 16,000 pounds of metallic steel charge.

Smaller bins or sacks may be utilized and charged by a conveyor into the furnace, thus eliminating the scrap bucket filling and discharging process. The bins or sacks approach may better assure that the quality of material being charged into the furnace is consistent, dirt and debris free, and free of other metallic and nonmetallic impurities.

Conveyors or hoists may be designed to include a connector that is releasably coupled to the attachment members of the respective wire sack or bin. As such, an operator may control the connectors for releasing the wire sack or bin directly into the furnace when desired. Any conventional connector that meets this type of construction may be used in this design.

Figure 7:
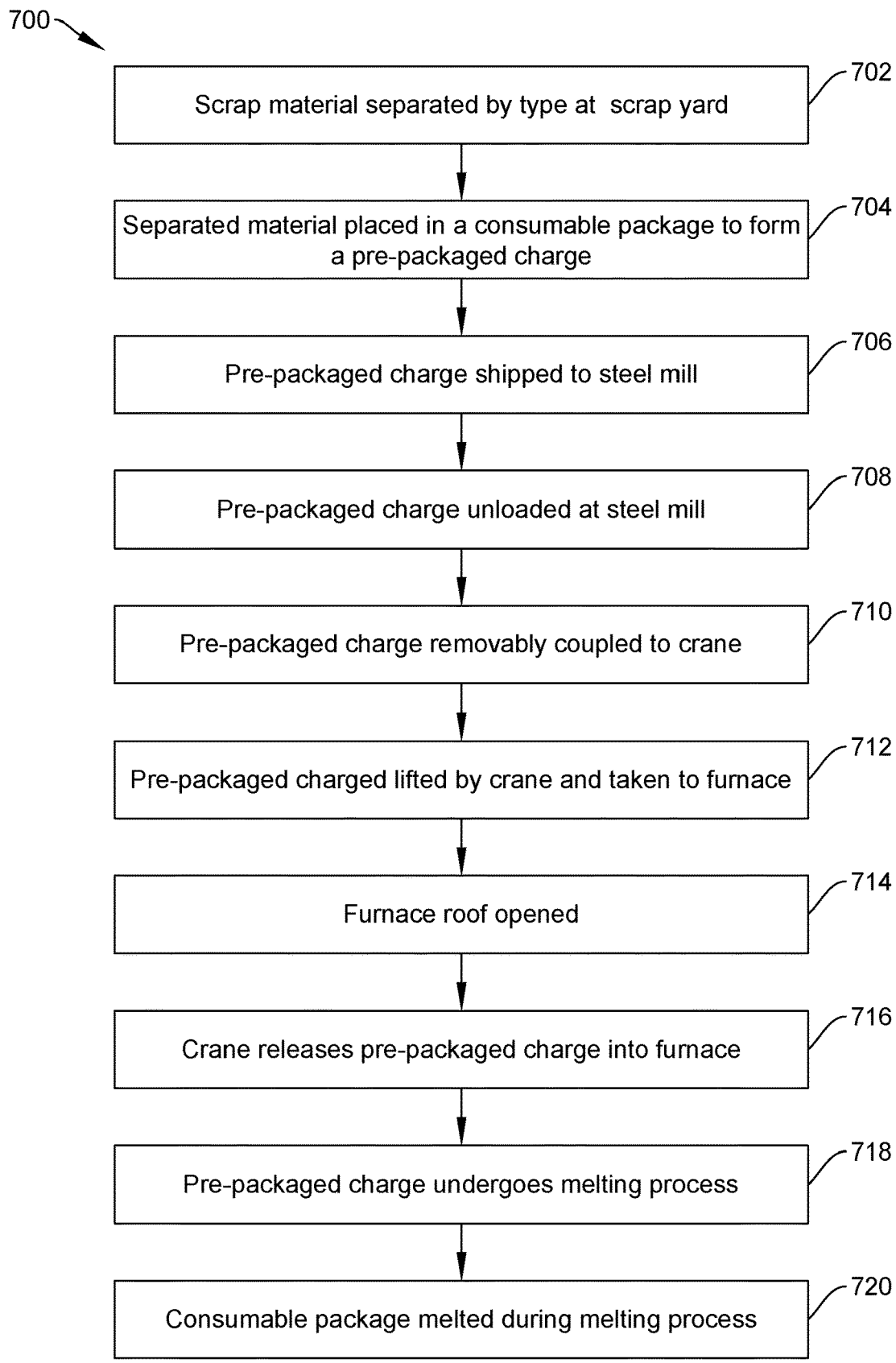
FIG. 7 illustrates a flow diagram of a segregating and packaging method of a charge and melting thereof.

Referring to FIG. 7, one embodiment of a charging and melting process 700 is shown. The process 700 includes a plurality of blocks or steps for performing the process. In a first block 702, for example, scrap material and the like may be separated according to certain characteristics as described above at a scrap yard. This may be by type of metal, ferrous vs. non-ferrous, etc. For instance, some grades of steel may allow for residuals like copper, whereas other grades of steel do not. At the scrap yard, the material may be separated into different piles according to the aforementioned characteristics.

Once the scrap material is separated, the material may be loaded into a disposable or consumable container such as the wire sacks, wire rope containers, bins, etc. as described above and shown in FIGS. 4-6. The combination of the separated material and the respective container forms a pre-packaged charge in block 704. The size of container used may depend upon the location it is being shipped to and the size of charge needed for a given melting operation. Different size containers may be stored or provided to the scrap yard for loading or forming the pre-packaged charge in block 704. Once the pre-packaged charge is formed, it may be loaded onto a gondola, rail car, or other transportable means (e.g., tanker, truck, etc.) and shipped to the iron or steel mill in block 706. It is desirable to load the pre-packaged charge into a gondola or rail car in high density, and the wire sacks, containers, bins, etc. can achieve this.

At the ironmaking or steelmaking mill, the pre-packaged charge may be unloaded in block 708 and releasably coupled to a crane, conveyor, or other lifting device in block 710. Connectors may be coupled to the attachment members in such a way that the pre-packaged charge may be simply deposited into the furnace at any point by releasing the connection therebetween. In block 712, for example, the pre-packaged charge may be taken to the furnace and lifted by the crane or conveyor up to the furnace. In block 714, the furnace roof may be opened and the pre-packaged charge may be lifted or raised and positioned above the open end of the furnace.

The crane or conveyor (or other lifting device) may then lower the pre-packaged charge, including the disposable or consumable wire sack, basket, container or bin, into the melt and release the pre-packaged charge in block 716. As the pre-packaged charge is released into the melt in block 716, the crane or conveyor may move out of the furnace area so that the roof can be closed. Once the roof is closed, the electrodes can be lowered into the melt to being the melting process in block 718. During the melting process, the wire sack, basket, container, bin, etc. that formed part of the pre-packaged charge is consumed in the furnace in block 720.

In some cases, the wire sack, basket, container, bin, etc. may be used to transfer the charge material from the scrap yard to the steel mill, for example, and once at the mill the charge material may be moved to a conventional scrap bucket. While this option still exists, the use of disposable container instead of the scrap bucket represents a more efficient and productive melting process. In any event, the use of the wire sack or other container still allows for debris, dirt, ice and other contaminants to be removed from the charge to reduce or eliminate metallic impurities. This can result in a higher metallic yield per volume of charge material, and a lower energy consumption per ton of production due to the elimination of up to 25% volume of dirt and debris.

The embodiments of the present disclosure may provide many savings and improvements that may accrue by using the system(s) described herein. For instance, the embodiments described herein may eliminate off-specification heats as a result of a reduction or elimination of metallic impurities in the scrap being used. As a result, the profit loss resulting from downgrading or scrapping heats due to incorrect composition may be eliminated. As described above, dirt and debris require significantly more energy per ton for melting when compared to steel.

The embodiments described herein may also provide more environmentally secure storage methods for scrap at the operating facility. Moreover, simplified charging methods may be provided for scrap whether it be by continued use of a scrap bucket or implementing a more continuous charging process.

While exemplary embodiments incorporating the principles of the present disclosure have been disclosed herein, the present disclosure is not limited to the disclosed embodiments. Instead, this disclosure is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of charging a pre-packaged charge in a metallurgical or refining furnace, comprising:
   providing a consumable metal container having a plurality of openings defined in a side and in a bottom of the container, wherein the metal container is formed of interconnected wire free of additional support structure and including a plurality of attachment members coupled to the interconnected wire;
   forming a pre-packaged charge by loading scrap material that includes desirable and undesirable materials into the consumable metal container, wherein the undesirable materials include dirt, debris, and other contaminants;
   removing the undesirable materials including dirt, debris and other contaminants from the pre-packaged charge during the forming step by allowing the dirt, debris, and other contaminants to drop through the plurality of openings;
   releasably coupling the plurality of attachment members of the consumable metal container to a lifting device;
   de-coupling the pre-packaged charge from the lifting device; and
   charging the scrap material and the consumable metal container in the furnace to melt both the scrap material and the consumable metal container.

2. The method of claim 1, further comprising selecting the consumable metal container based on a type of the desirable materials of the scrap material for forming the pre-packaged charge.

3. The method of claim 1, wherein the forming step is performed at a location remote from the furnace and includes folding the interconnected wire to form the pre-packaged charge.

4. The method of claim 3, wherein the forming step is performed at a scrap yard.

5. The method of claim 1, wherein the de-coupling step comprises releasing the plurality of attachment members from the lifting device.

6. The method of claim 1, further comprising:
   opening a roof of the furnace before the de-coupling step;
   positioning the pre-packaged charge at a location above the furnace once the roof is opened; and
   lowering the pre-packaged charge into the furnace.

7. The method of claim 6, further comprising closing the roof immediately after the de-coupling step.

8. The method of claim 1, further comprising melting the consumable metal container with the scrap material.

9. The method of claim 1, further comprising:
   loading the pre-packaged charge in a transport vehicle at a location remote from the furnace, wherein the location is a scrap yard;
   transporting the pre-packaged charge to the furnace;
   transferring the pre-packaged charge from the transport vehicle; and
   performing the charging step after the transferring step.

10. A pre-packaged charge for being discharged into a metallurgical or refining furnace, comprising:
   a consumable container comprising a body formed by a plurality of interconnecting wire free of additional support structure, the body defining a plurality of gaps between the plurality of wire;
   a plurality of attachment members formed with or coupled to the body; and
   segregated scrap disposed in the container, the segregated scrap including a desirable material being of a particular material type, and wherein the segregated scrap includes undesirable materials;

wherein, the consumable container is made of a type of material that is substantially the same as the desirable material of the scrap;

wherein, the pre-packaged charge is free of the undesirable materials that include dirt, debris and other contaminants which freely drop through the plurality of gaps defined in the consumable container.

11. The pre-packaged charge of claim 10, wherein the consumable container comprises a metallic concave-shaped basket formed by the plurality of interconnecting wire free of additional support structure, wherein the plurality of interconnecting wire radially diverges from a bottom end thereof.

12. The pre-packaged charge of claim 10, wherein the consumable container comprises a substantially flat wire body formed by the plurality of interconnecting wire free of additional support structure which define the plurality of gaps therebetween, where the plurality of attachment members are located at least at each corner of the body.

13. The pre-packaged charge of claim 10, wherein the consumable container comprises a box-shaped wire body formed by the plurality of interconnecting wire free of additional support structure, the container including a bottom, an open top, and sides in which the bottom and sides include the plurality of gaps, and the plurality of attachment members being coupled to the sides of the wire body.

14. A method of charging a pre-packaged assembly in a metallurgical or refining furnace, comprising:

separating scrap that includes a desirable material and undesirable materials, the desirable material based on at least one characteristic;

loading the scrap that includes the desirable material and the undesirable materials into a consumable metal container having a body formed by a plurality of interconnecting wire free of additional support structure and having a plurality of attachment members coupled to the body;

forming the pre-packaged assembly as a combination of the scrap that includes the desirable material, the undesirable materials, and the consumable metal container;

removing the undesirable materials including dirt, debris and other contaminants from the scrap during the forming steps;

coupling the plurality of attachment members of the container to a lifting device;

lifting the pre-packaged assembly into the furnace with the lifting device;

releasing the plurality of attachment members from the lifting device; and charging the pre-packaged assembly in the furnace for a melting operation.

15. The method of claim 14, further comprising:

loading the pre-packaged assembly in a transport vehicle at a location remote from the furnace;

transporting the pre-packaged assembly to the furnace with the transport vehicle;

transferring the pre-packaged assembly from the transport vehicle; and performing the charging step after the transferring step.

16. The method of claim 15, further comprising removing the undesirable materials including dirt, debris and other contaminants from the scrap during the loading step.

17. The method of claim 16, wherein the undesirable materials including dirt, debris and other contaminants are removed from the pre-packaged assembly by falling through one or more openings defined in the consumable metal container.

18. The method of claim 14, further comprising selecting the consumable metal container based on the at least one characteristic.

* * * * *